United States Patent [19]
Katano

[11] Patent Number: 5,177,506
[45] Date of Patent: Jan. 5, 1993

[54] PROCESS FOR FORMING IMAGE ON NOVEL RECORDING MEDIUM

[75] Inventor: Yasuo Katano, Yokohama, Japan

[73] Assignee: Ricoh Company, Ltd., Tokyo, Japan

[21] Appl. No.: 788,414

[22] Filed: Nov. 6, 1991

[30] Foreign Application Priority Data

Nov. 7, 1990 [JP] Japan .................... 2-303367

[51] Int. Cl.[5] .................... G11B 3/00; G01D 9/00
[52] U.S. Cl. .................... 346/151; 346/1.1
[58] Field of Search .................... 346/1.1, 151

[56] References Cited

U.S. PATENT DOCUMENTS 3,910,187 10/1975 Cords .................... 430/302
5,010,356 4/1991 Albinson .................... 346/140 R

OTHER PUBLICATIONS

"Heterogeneous Nucleation of Polymer Melts on Surface I. Influence of Substrates on Wettability" Polymer Letters vol. 5, pp. 919-924 (1967).
Harold Shonhorn, "Heterogeneous Nucleation of Polymer Melts on High-Energy surface. II. Effect of Substate on Morphologh and Wettability" Dec. 1, 1967.
Harold Shonhorn and Frank W. Ryan, "Adhesion of Polytetrafluoroehylene" J. Adhesion, vol. 1 (Jan. 1969).
Kastsuyuki Hara and Harold Shonhorn, "Effect of Surface Condition on Wettability of FEP Teflon" Journal of Japan Adhesion Association vol. 6 No. 2 (1970).

Primary Examiner—George H. Miller, Jr.
Attorney, Agent, or Firm—Oblon, Spivak, McClelland, Maier & Neustadt

[57] ABSTRACT

A process of the present invention forms an image on a recording medium, the surface of the recording medium having a characteristic in which a receding contact angle decreases when the recording medium is heated under a condition in which a solid material is in contact with the surface of the recording medium. The process includes the following steps (a) through (d) of: (a) bringing a solid member into contact with the surface of the recording medium; (b) selectively heating the surface of the recording medium, so that the surface of the recording medium is heated under a condition in which the solid member is in contact with the surface of the recording medium; (c) cooling the recording medium under the condition in which the solid member is in contact with the surface of the recording medium; and (d) separating the solid member from the surface of the recording medium. As a result, a receding contact angle on an adhesive area is decreased, and a latent image corresponding to the adhesive area is formed on the surface of the recording medium.

21 Claims, 9 Drawing Sheets

FIG. IA
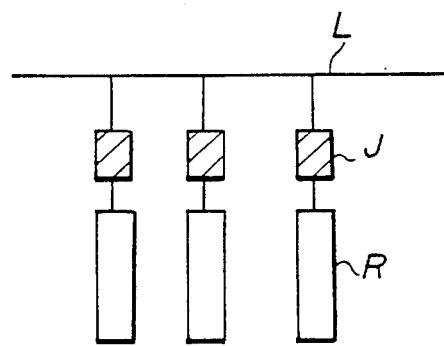
FIG. IB
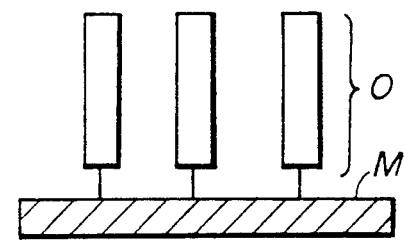
FIG. IC
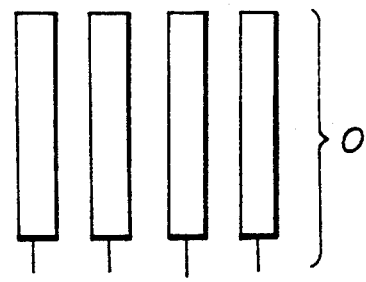
FIG. ID
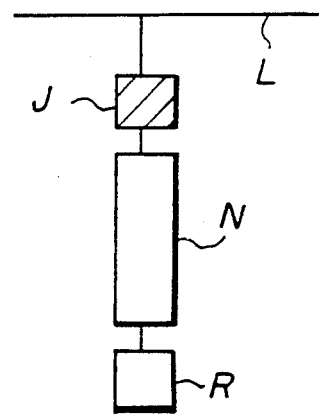

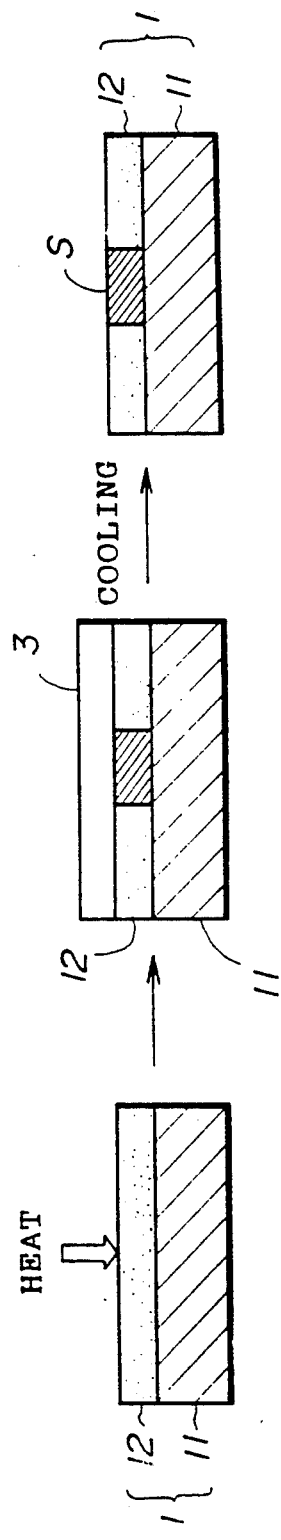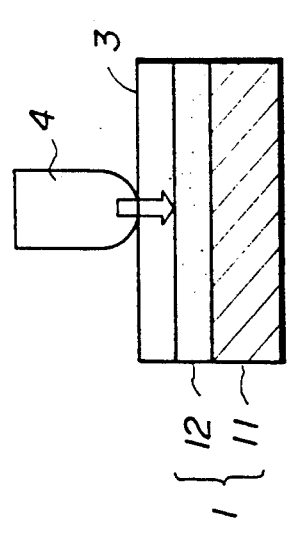

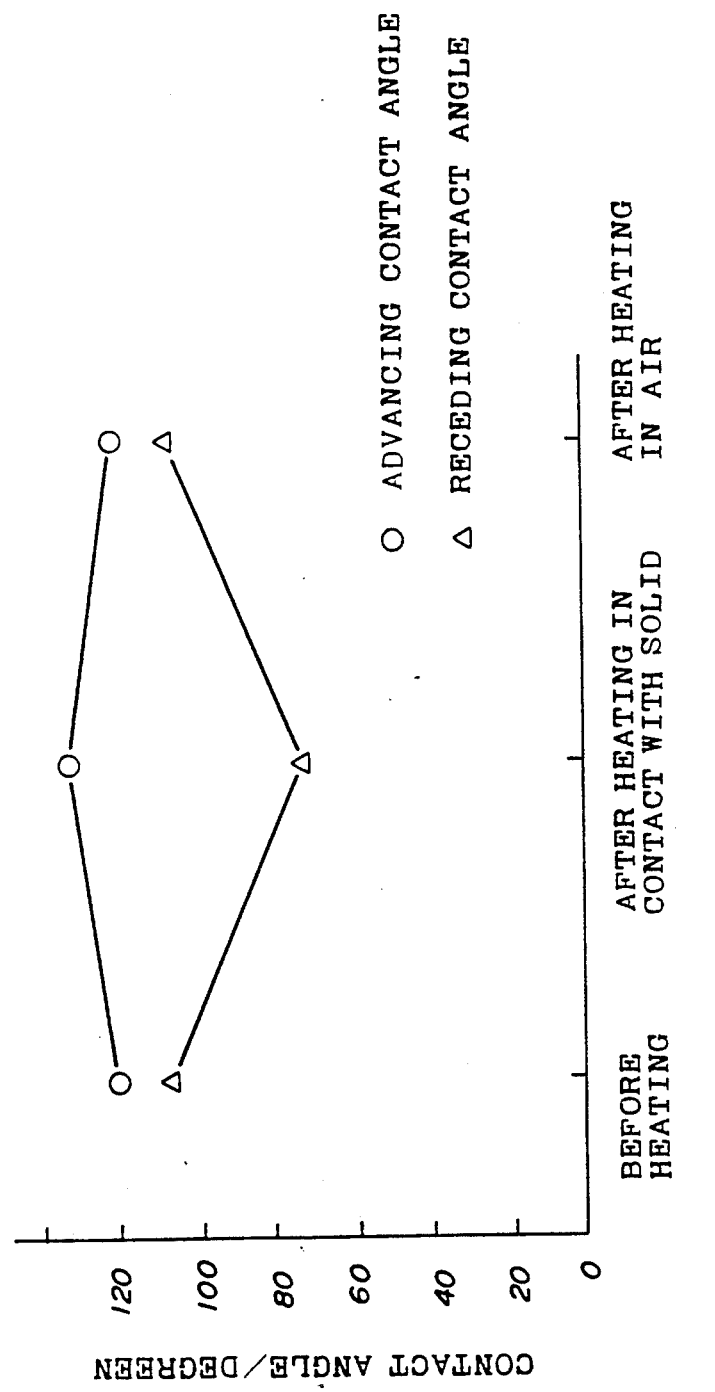

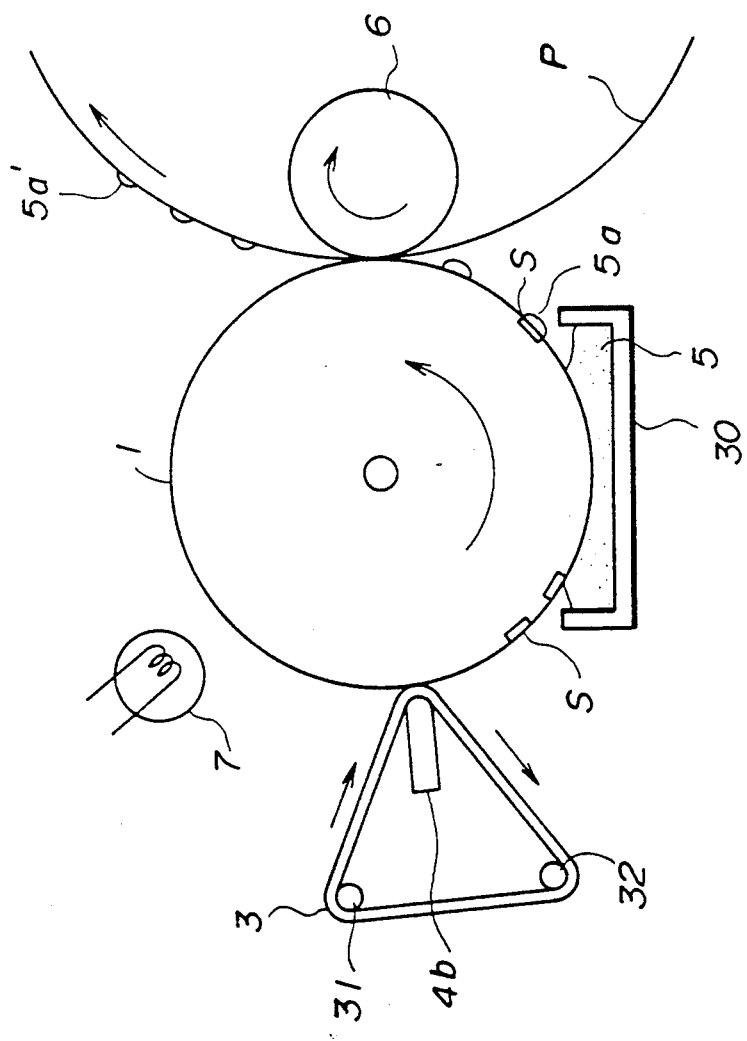

PROCESS FOR FORMING IMAGE ON NOVEL RECORDING MEDIUM

BACKGROUND OF THE INVENTION (1) Field of the invention

The present invention generally relates to a process for forming an image on a novel recording medium, and more particularly to a process for forming an image on a novel recording medium, the recording medium having a characteristic in which a receding contact angle decreases when the recording medium is heated in a condition in which the recording medium is in contact with a solid material such as metal.

(2) Description of related Art

An offset printing method using a printing plates without water (water for moisturizing) is a typical one of methods in which a recording medium is divided into areas where it is easy for liquid to adhere thereto and area where it is hard for the liquid to adhere thereto. However, in this offset printing method, it is difficult to incorporate a process for manufacturing printing plates from original plates and a process for printing from the printing plates into a single apparatus. This makes it difficult to have a compact printing apparatus.

For example, even in a case of relatively compact offset printing apparatus, a plate making apparatus and a printing apparatus are separated.

To eliminate this fault of the offset printing method, there has been proposed a recording method and apparatus in which areas where it is easy for the liquid to adhere thereto and areas where it is hard for the liquid to adhere thereto can be formed in accordance with image information and in which the recording medium can be repeatedly used ( a process for forming an image is reversible). The following are some of these.

① Water-soluble developing method

After a charge has been applied from an external device to a hydrophobic photo-electric layer, a medium having the hydrophobic photo-electric layer is exposed so that a pattern having hydrophobic portions and hydrophilic portions is formed on the surface of the hydrophobic photo-electric layer. Then, a water soluble developing solution adheres to only the hydrophilic portions and is transferred to a paper or the like. Such methods and apparatus are disclosed in Japanese Patent Publication Nos.40-18992, 40-18993 and 44-9512 and Japanese Patent Laid Open Publication No.63-264392, etc.).

② Method using a photo-chemical response of a photo-chromic material

In this method, an ultraviolet light is irradiated to a layer which contains a material such as a spiropyran or an azo dye so that a photo-ohemioal reaction occurs to make the photo-chromic material hydrophilic. Such method and apparatus are described in "Japanese Journal of Polymer Science and Technology" Vol.37, No.4 page 287, 1980).

③ Method using an action of an internal biasing forces

In this method, amorphous substances and crystalline substances are formed in a recording medium by a physical transformation, so that portions where it is easy for a liquid ink to adhere thereto and portions where it is hard for the liquid ink to adhere thereto are formed on the recording medium. An example of such is disclosed in Japanese Patent Laid Open Publication No.54-41902.

According to the previously described method ①, after the water-soluble ink is transferred to the paper or the like, the hydrophilic portions are removed by removing the charge so that it is possible to record other image information. That is, one original plate (photoelectric member) can be repeatedly used for printing images. However, in this method, an electrophotogaphy process is basically used, so that a long time is required for carrying out the process involving steps of charging, exposing, developing, transferring and discharging. Therefore, it is difficult to make an apparatus compact, to reduce its cost and to make an apparatus in which it is unnecessary to maintain.

In the method ② described above, it is possible to freely control the reversibility of the hydrophilic and hydrophobic properties by selective irradiation of ultraviolet and visible light. However, since a quantum efficiency is very small, a response time is extremely long and a recording speed is low. In addition, there is also a fault of image instability. Therefore, this method has still not been put into practical use.

Furthermore, an information recording member (the recording medium) which is used in the method ③ has stability after an image is formed thereon, but there are occasions on which structural transformation occurs in the information recording member due to temperature changes prior to the recording. That is, the method ③ has a disadvantage in that it is difficult to maintain the image on the information recording member. In addition, when recorded information patterns is erased, a thermal pulse must apply to the information recording member and then it is necessary to rapidly cool the information recording member. Therefore, it is difficult to perform frequent repetition of image formation.

SUMMARY OF THE PRESENT INVENTION

Accordingly, a general object of the present invention is to provide a novel and useful process and apparatus for forming an image on a recording medium in which the disadvantages of the aforementioned prior art are eliminated.

A more specific object of the present invention is to provide a process for forming an image on a recording medium in which a predetermined pattern area can be selectively or selectively and reversibly formed on the surface of the recording medium.

Another object of the present invention is to provide a process for forming a high quality visible image on a recording medium, or on a recording sheet by a transfer process in which the visible image formed on the recording medium is transferred to the recording sheet.

Furthermore, another object of the invention is to provide a process for forming an image on a recording medium in which a pattern forming/erasing step, an image visualizing step, and a transfer step can be reversibly carried out a plurality of times.

The above objects of the present invention are achieved by a process for forming an image on a recording medium, a surface of the recording medium having a characteristic in which a receding contact angle decreases when the recording medium is heated under a condition in which a solid material is in contact with the surface of the recording medium, the process comprising the following steps (a) through (d) of: (a) bringing a solid member into contact with the surface of the recording medium (b) selectively heating the surface of the recording medium, so that the surface of the recording medium is heated under a condition in which the solid member is in contact with the surface of the recording medium; (c) cooling the recording medium under the condition in which the solid member is in contact with the surface of the recording medium; and (d) separating the solid member from the surface of the recording medium, whereby a receding contact angle on an adhesive area which is an area heated by the step (b) on the surface of the recording medium is decreased and reaches a value corresponding to a temperature at which the adhesive area is heated, and whereby a latent image corresponding to the adhesive area is formed on the surface of the recording medium.

The above recording medium has the following novel characteristic. (1) In a case where the recording medium is selectively heated under a condition in which a solid material is in contact with the recording medium and then the solid material is separated from the recording medium after the recording medium is cooled, a receding contact angle on the surface of the recording medium is decreased so that the surface of the recording medium has a receding contact angle corresponding to a temperature obtained by heating (the amount of heating energy). (2) In a case where the solid material is brought into contact with the recording medium under a condition in which the recording medium has been heated and then the solid material is separated from the recording medium after the recording medium is cooled, a receding contact angle on the surface of the recording medium is decreased so that the surface of the recording medium has a receding contact angle corresponding to a temperature obtained by heating (the amount of heating energy).

The solid material which is brought into contact with the recording medium can be formed of a conductor or an insulator. The conductor includes a metal such as aluminum, copper and the like, an alloy such as stainless steel, brass and the like, and a semi-metal such as graphite. The insulator includes a resin, such as polyimide, polyethylene terephthalate, polytetrafluoroethylene, silicon and the like, glass, and ceramic. The insulator has no flowability when the insulator is in contact with the heated recording medium.

In the present invention, the latent image formed on the recording medium can be developed by a recording agent including a colorant. In addition, the visible image formed on the recording medium by a developing process can be transferred to a recording sheet. The recording agent is in a liquid state.

In a state where the recording medium on which the latent image has been formed is heated in air, in a vacuum or in an inert gas, the latent image is erased. That is, the reversible forming of the image can be performed on the recording medium.

According to the present invention, as the recording medium having the novel characteristic described above is used to form an image, an image can be reversibly obtained by a simple operation.

Additional objects, features and advantages of the present invention will become apparent from the following detailed description when read in conjunction with the accompanying drawings.

BRIEF DESCRIPTION OF THE DRAWINGS

FIGS.1A through 1D are views indicating models of the structure of a material having a surface self-orientation function.

FIGS.2A, 2B are views for describing the fundamental aspects of the image recording process according to the present invention.

FIG.3 is a graph indicating the changes in an advancing contact angle and a receding contact angle in a surface of a recording medium.

FIG.6. is a diagram illustrating an image forming apparatus according to a first embodiment of the present invention.

DETAILED DESCRIPTION OF THE INVENTION

Figure 4A:
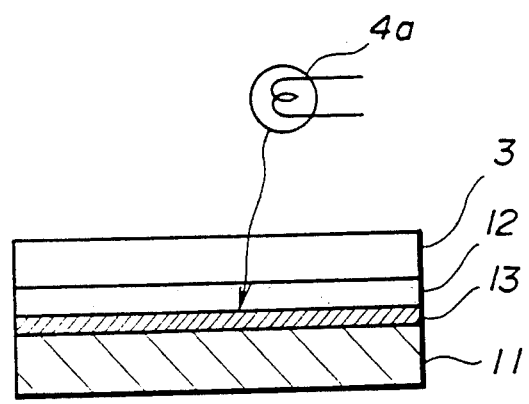
FIGS.4A and 4B are diagrams illustrating methods for heating the recording medium.

The inventors of the present invention carried out much research and investigation regarding a novel recording method in which the faults described for the conventional technologies had been eliminated. As a result of this, the inventors discovered that a member having the following novel characteristic can be effectively used as a recording medium.

That is, in a case where the member is heated under the condition in which the solid material is in contact therewith and then the member is cooled, the receding contact angle on the member is decreased. In addition, when the member is heated in an air (the surface of the member is a free surface), the receding contact angle increases and returns to an original value.

One of the members having the above characteristic is a first member (1) in which the surface portion thereof includes an organic compound having a surface self orientation function with a hydrophobic group, or a second member (2) in which the surface portion thereof is an organic compound having the hydrophobic group which is oriented to the surface.

The "surface self orientation function" in the first member (1) is defined as a function whereby the hydrophobic group at the surface is oriented towards the side of the air (i.e. the side with the free surface) when a solid member comprising a base member and an organic compound formed on the base member or a solid organic compound is heated in the air. This definition is also used for the second member (2). In general, an organic compound offers a phenomena in which a hydrophobic group is easily oriented towards the side of a hydrophobic atmosphere. As the orientation is towards the side at which the interfacial energy of the solid-gas boundary decreases, the above phenomena occurs. In addition, this phenomena is remarkable for the longer the molecular chains of the hydrophobic group, because the larger the molecular chain the mobility of the molecule becomes larger.

More specifically, in a case of a molecule which has a hydrophobic group at an end thereof (i.e. a molecule in which the surface energy is low), the hydrophobic group is easily oriented in a direction of the side of the air (i.e. the side with the free surface). In the same manner, in a case of chain molecules which include $-CH_2)_n$, $-CH_2)_n$ portions are flat and easily oriented. In addition, in molecules which include

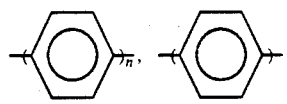

portions also have a flat structure and are easily oriented. Especially, the chain molecules including a chemical element in which an electronegativity is large, such as a fluoride, have a large self aggregation. In the chain molecules, a mutual molecular chains are easily oriented.

To summarize the results of these investigations, in a chain molecule which includes a molecule having a large self aggregation or a molecule having a flat structure and has the hydrophobic group at an end thereof, or in an organic compound including the above chain molecule, the surface self orientation function is large.

As is clear from the preceding discussion, there is a relationship between the surface self orientation and the receding contact angle. In addition, there is also a relationship between the receding contact angle and the liquid adhesiveness. That is, the adhesion of the liquid to the surface of the solid mainly occurs due to a tacking force for tacking the liquid at the surface of the solid. The, tacking force can be regarded as a type of friction which is generated when the liquid slides against the surface of the solid. Thus, in this invention, the "receding contact angle" $\theta_r$ can be denoted by the following formula.

$$\cos \theta_r = \gamma \cdot (\gamma_s - \gamma_{sl} - \pi_e + \gamma_f)/\gamma_{ev}$$

where:
$\gamma$: the roughness factor
$\gamma_{sl}$: the interfacial tension at the solid-liquid interface
$\gamma_{ev}$: surface tension of the liquid in equilibrium with its saturated vapor
$\pi_e$: equilibrium surface pressure
$\gamma_f$: friction tension
$\gamma_s$: surface tension of a solid in vacuum The above formula is disclosed by Saito, Kitazaki et al, "Japan Contact Adhesive Association Magazine" Vol.22, No.12, No.1986.

According to the above formula, when the receding contact angle $\theta_r$ decreases, the friction force $\gamma_f$ increases. That is, when the receding contact angle decreases, it becomes hard for the liquid to slip on the surface of the solid. As a result, the liquid is adhered to the surface of the solid.

As can be assumed from the above mutual relationships, the adhesiveness of the liquid depends on the receding contact angle $\theta_r$. This receding contact angle $\theta_r$ depends on types of materials which have the surface self orientation function at the surface thereof. Hence, in the present invention, it is necessary to forming a predetermined pattern area on the recording medium (A) and/or to make a visible image corresponding to the pattern area by a recording agent, so that a member in which the surface thereof has the surface self orientation function is selected as the recording medium (A).

The recording medium (A) used in the present invention has a surface in which the receding contact angle $\theta_r$ decreases when the surface is in contact with the solid member under a condition of heating it.

The recording medium (A) can be of any shapes as long as the surface thereof has the nature described above. Thus, the recording medium (A) can be of a film shape. The recording medium (A) can also have a structure in which a coating film or the like having the nature described above is provided on the surface of a supporting member. The recording medium (A) can be structured by only one member in which the surface thereof has the nature described above.

An area where it is easy for the liquid to adhere thereto, which area is formed on the recording medium (A), becomes either a lipophilic area or a hydrophilic area. Thus, either oil-soluble ink or water-soluble ink is used for printing an image.

FIGS.1A through 1D indicate a classification of the types of materials or portions of materials "having a surface for which the receding contact angle $\theta_r$ decreases when the material is heated and brought into contact with a solid member". FIG.1A indicates an example of a compound having a self-orientation function. This compound has a hydrophobic group on the side chains of the macromolecule polymer. The main chain L and the hydrophobic group R are linked by a linking group J.

FIG.1B indicates an example of a material in which the hydrophobic group in an organic compound are oriented towards the surface thereof. The compound O having the previously described hydrophobic group is formed by the physical or chemical linking to the surface of an organic or inorganic material M. FIG.1C shows an example of a material which is made up of only the organic compound O having the hydrophobic group indicated in FIG.1B.

FIG.1D indicates an example where the chain molecules are in a side chain of a macromolecule. The chain molecules and the main chain L are linked by the linking chain J. This is a compound in which each chain molecule has a molecular chain N having either a flat structure of a self-aggregation and the hydrophobic group R is linked at an end of the molecular chain N.

In the examples shown in FIGS.1A and 1D, the main chain L of the macromolecule compound can either have a linear shape or a network structure.

In the example indicated in FIG.1B, as in a case of a deposited Lngmuir-Blodgett film, it is also possible to use a compound O including a hydrophobic group and then deposit a compound O including a hydrophobic group on another one. In the example indicated in FIG.1C, there is only a compound including a hydrophobic group, with there being no main chain L and no linking to an organic or inorganic material (M) or the like.

The previously described hydrophobic group should desirably have the end molecules as $-CH_3$, $-CF_3$, $-CF_2H$, $-CFH_2$, $-C(CF_3)_3$, $-C(CH_3)_3$ or the like. More desirably however, it is advantageous if this hydrophobic group has long molecules which have a high molecular mobility. Of these, the previously described hydrophobic group can be an alkyl group in which either a fluorine or a chlorine is substituted for at least one hydrogen thereof, which alkyl group has more than one $-F$ and/or $-Cl$, such as

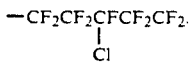

The above hydrophobic group can also be an alkyl group having a carbon number equal to or greater than 4. An alkyl group in which either a fluorine (F) or a chlorine (Cl) substituted for at least one hydrogen thereof can be used and it is more effective if an alkyl group in which a fluorine is substituted for at least one hydrogen thereof is used. It is further more effective that a compound has the polymer whose side chain includes fluorine.

The principle of this function is not yet perfectly understood but is assumed to be as described below.

First, it will be considered that the recording medium (A) formed by this compound described above has a surface on which the hydrophobic group is considerably oriented. Thus, this surface has a liquid repellency property (since the surface energy of the hydrophobic group is the smaller). In this state, when the surface of the recording medium (A) and the solid member are brought into contact with each other and heated, the heating causes the molecular motion of the hydrophobic group to increase and the recording medium (A) and the solid member are interacted with each other. Thus, an orientation state of at least one portion of the recording medium (A) changes into another one (for example, the orientation is disordered). Then the changed state is maintained after the solid member is separated from the recording medium (A) and the recording medium (A) is cooled.

Prior to heating, because the hydrophobic group is oriented in the surface of the recording medium (A), the surface energy of the recording medium (A) is extremely low. However, by heating the recording medium (A) in the state where the solid member is in contact therewith, the orientation is disordered and the surface energy increases. The receding contact angle $\theta_r$ is determined by the balance between the surface energy of the recording medium (A) and surface energy of the liquid. If the surface energy of the recording medium (A) is high, then irrespective of the type of liquid, the receding contact angle $\theta_r$ will become smaller. Thus, the adhesiveness with respect to the liquid will increase as a result.

Furthermore, after the orientation state in the surface of the recording medium (A) changes into another orientation state or a state in which the orientation is disordered, when the recording medium (A) is heated under condition where there is no solid member in contact with the recording medium (A), the interaction between the recording medium (A) and the solid member does not occur, so that the recording medium (A) reverses to the former orientation state.

Accordingly, the solid member is not one where it simply performs cooling after the surface of the recording medium (A) has been heated, but is one which is interacted with the recording medium (A). Due to the interaction between the recording medium (A) and the solid member, the state of the recording medium (A) can be changed into another state (either a state where there is an orientation different from the former orientation state or a state where the orientation has been disordered).

As has been described above, when the hydrophobic group of a member (compound) forming the surface of the recording medium (A) is an alkyl, an alkyl group in which either a fluorine or a chlorine is substituted for at least one hydrogen thereof, then it is necessary for the carbon number of the alkyl to be 4 or more. This carbon number equal to or greater than 4 is thought to be the necessary number for active molecule motion when heating is performed, and for a certain degree of orientation of the alkyl on the surface of the recording medium (A). In addition, when the solid member is heated along with the surface of the recording medium (A), it is thought that the molecules of the solid member are incorporated into the molecules of the surface of the recording medium (A). Furthermore, an alkyl group including fluorine or chlorine which has a high electronegativity is used, then there is a large interaction with liquid and particularly liquids having polarity and so there is a larger change in the adhesiveness than in the case of a compound that includes an alkyl group in which there are not fluorine and chlorine. In addition, the alkyl group which includes fluorine has a strong self-aggregation and so the surface self-orientation function is also high. Still furthermore, the alkyl group which includes fluorine has a low surface energy and so have an excellent effect in prevention the surface of the recording medium (A) from being dirtied.

Moreover, the surface of the recording medium (A) has a liquid repellency effect. This may be described in terms of the surface energy of a solid solid. In the course of the investigation performed by the inventors, it was found that it is desirable as far as use for a recording method is concerned, for this surface energy to be 50 dyn/cm or less. When the surface energy of the recording medium (A) is greater than 50 dyn/cm, the surface of the recording medium is easily wet and it is possible to become dirty with the recording agent.

A detailed description will now be given of a compound forming the surface of the recording medium (A).

A compound in which an alkyl group (which can include fluorine and/or chlorine) is included in the side chain of a polymer can be preferred as the type of compound as shown in FIG. 1A or 1D. More specifically, monomers indicated in (I), (II), (III), (IV), (V), (VI) and (VII) are preferred.

-continued $$CH_2=CR \atop | \atop (CH_2)_{n'}-Rf \qquad (VII)$$

R is either —H, —CH$_3$, —C$_2$H$_5$, —CF$_3$ or —C$_2$F$_5$.

Rf is either an alkyl group having a carbon number equal to or greater than 4, a group including an alkyl group in which either a fluorine or a chlorine is substituted for at least one hydrogen thereof, or a hydrophobic group in which

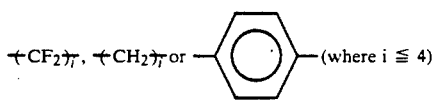

n' is an integer and equal to or greater than 1.

Other polymers are those indicated in (VIII), (IX) and (X).

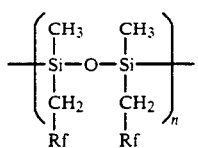  (VIII)

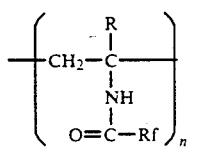  (IX)

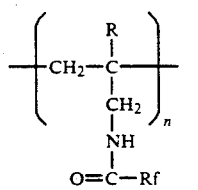  (X)

R is either —H, —CH$_3$, —C$_2$H$_5$, —CF$_3$ or —C$_2$O$_5$.

Rf is either an alkyl group having a carbon number equal to or greater than 4, a group including an alkyl group in which either a fluorine or a chlorine is substituted for at least one hydrogen thereof, or a hydrophobic group in which

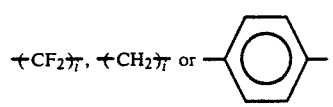

is provided in the molecule chain (where i≧4).

n is an integer and equal to or greater than 10.

In these (I) through (X), Rf can be as indicated in to the following (1) through (20).

—CH$_2$CF$_2$CHFCF$_3$  (1)

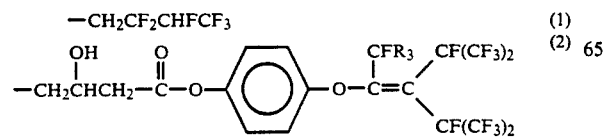  (2)

$$-CH_2CH_2OC-C_7F_{15} \atop \| \atop O \qquad (3)$$

$$-CH_2CH_2N-C-(CF_2)_7CF(CF_3)_2 \atop | \quad \| \atop C(CH_3)_3 \; O \qquad (4)$$

$$-CH_2CHCH_2(CF_2)_4CF_3 \atop | \atop OH \qquad (5)$$

—CH$_2$(CF$_2$)$_{10}$H  (6)

$-(CF_2)_6O-CF_2CF_3$  (7)

$-(CH_2)_4NH-CF_2CF_3$  (8)

$-(CF_2)_6CF_3$  (9)

$-(CH_2)_{10}C_8F_{17}$  (10)

$$-CH_2N-SO_2C_8F_{17} \atop | \atop C_2H_5 \qquad (11)$$

$$-(CH_2)_{10}NSO_2C_8F_{17} \atop | \atop CH_3 \qquad (12)$$

—CH$_2$NHSO$_2$C$_8$F$_{17}$  (13)

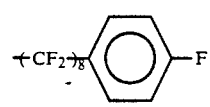  (14)

c.s-CH$_2$CH$_2$—(CF$_3$)$_6$CF(CF$_3$)$_2$  (15)

—CH$_2$CF$_2$CF$_2$CF$_3$  (16)

—CH$_2$CH$_2$CH$_2$CH$_2$F  (17)

—CH$_2$(CF$_2$)$_6$CF$_3$  (18)

—CH$_2$(CF$_2$)$_5$CF$_3$  (19)

$-(CH_2)_3CF_3$  (20)

The following material (XI) can be selected for particular consideration from the above compounds.

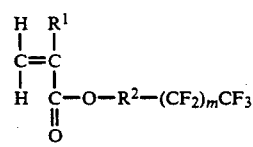  (XI)

where R$^1$ is either hydrogen, —C$_n$H$_{2n+1}$ or —C$_n$F$_{2n+1}$ (n is an integer, n+1 or n≧2), R$^2$ is either —(CH$_2$)$_p$ (where p is an integer, p≧1) or —(CH$_2$)$_q$N(R$^3$)SO$_2$—(where R$^3$ is either —CH$_3$ or C$_2$H$_5$, q is an integer, q≧1), and m is an integer equal to or greater than 6.

Accordingly, the following compounds are given as the most desirable compound for use as the member for the surface of the recording medium (A) of the present invention.

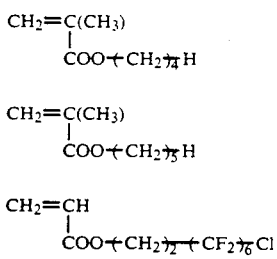
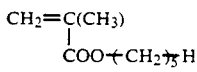
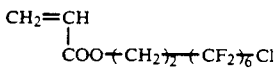
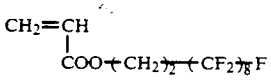
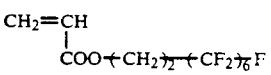
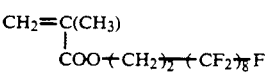
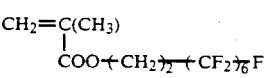
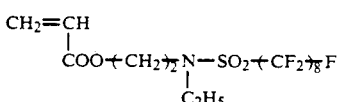
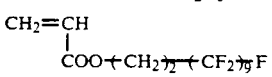
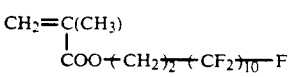

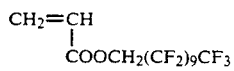
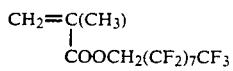
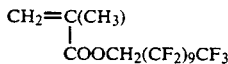

Moreover, a copolymer made of some of monomers indicated in (I) (II) (III) (IV) (V) (VI) (VII) and (XI) and other monomers such as ethylene, vinyl chloride, styrene, butadien, isoprene, chloroprene, vinyl alkyl ether, vinyl acetate and vinyl alcohol can be also used as the compound forming the surface of the recording medium (A).

In addition, a copolymer is made of a monomer represented by the formula (XI) and at least one of the following monomers each having a functional group.

$$CH_2 + C(CH_3)COO(CH_2)_2OH$$

$$CH_2 + C(CH_3)COOCH_2CH(OH)CH_3$$

$$CH_2 + CHCOOCH_2CH(OH)C_8F_{17}$$

As a result, many functional groups are formed in the copolymer. In this manner, the manufactured substance has excellent properties as crosslinking type of polymer. Either formaldehyde, dialdehyde, N-Methylol compounds, dicarboxylic acid, dicarboxylic acid chloride, bis-halogen compounds, bis epoxide, bis aziridine, diisocyanate and the like can be used as the crosslinking agent. The following is one example of a crosslinking polymer obtained in this manner.

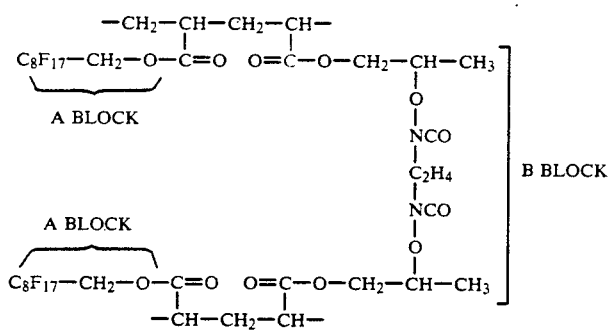

In the above formula, the A block is an alkyl group which brings on the previously described change in the thermal nature. The B block is the agent that crosslinks property of chain polymers (with diisocyanate being used as the crosslinking agent).

A liquid in which the above described copolymer and the crosslinking agent are mixed is coated on a substrate, and then either heating or irradiating electrons or light with respect to the substrate coated the liquid, so that a crosslinked film is formed on the substrate.

The process for obtaining the polymer from the monomer is selected in accordance with materials from solution polymerization, electrolysis polymerization, emulsification polymerization, photo polymerization, radiation polymerization, plasma polymerization, graft

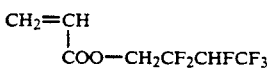
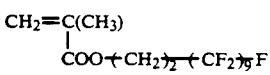
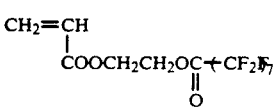
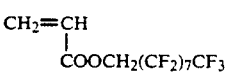

polymerization, plasma-iniciated polymerization, vapor deposition polymerization and the like.

A description will now be given of the compound indicated in FIG.1B.

It is desirable that One of the following materials indicated by (XII), (XIII) and (XIV) be used for making the compound.

$$R_f\text{—COOH} \qquad (XIII)$$

$$R_f\text{—OH} \qquad (XIII)$$

$$R_f\text{—}(CH_2)_n SiX \qquad (XIV)$$

where, $R_f$ is either an alkyl group in which a carbon number is 4 or more, a group including an alkyl group in which fluoride or chloride is substituted for at least one hydrogen thereof, a hydrophobic group in which $-(CF_2)_{1'}$, $-(CH_2)_1$ or

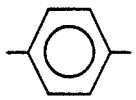

is included in the molecular chain (where $1 \geq 4$), n is an integer equal to or greater than 1, and X is either chlorine, methoxy group or ethoxy group.

On the above materials is physically absorbed or chemically connected to the surface of an inorganic material such as gold or copper or an inorganic material such as polyester or polyethylenterephthalate (and preferably the material has a surface energy of approximately 50 dyn/cm or less).

The following are specific examples of the materials in formula (XII), (XIII) and (XV).

$$CF_3\text{—}(CF_2)_5\text{—COOH}$$

$$CF_3\text{—}(CF_2)_7\text{—COOH}$$

$$CF_3\text{—}(CF_2)_7\text{—}(CH_2)_2\text{—OH}$$

$$H\text{—}(CF_2)_{10}\text{—COOH}$$

$$H\text{—}(CF_2)_{10}\text{—}CH_2OH$$

$$F\text{—}(CF_2)_6\text{—}CH_2CH_2\text{—}Si(CH_3)_2Cl$$

$$CF_2Cl(CF_3)CF(CF_2)_5COOH$$

$$CF_3(CF_2)_7(CH_2)_2SiCl_3$$

The compound indicated in FIG.1C can have a structure where there is only the material of (XII), (XIII) or (XIV).

A description will now be given of the recording medium (A) formed of the above compound.

The configuration of the recording medium (A) is such that it is (1) formed by the previously described surface member itself, or (2) formed by the previously described surface member on a supporting member (preferably a supporting member having heat resistance). The above compound (surface member) which applies to (1) above have either a plate or film shape, or can also be formed as a cylinder. In this case, it is desirable for a film shape to have a film thickness of between 1 μm and 5 μm.

In a case of the compound pertaining to (2) above, it is permitted for the above described compound to permeate some distance into the supporting member. It is desirable that the film thickness of the recording medium (A) itself be from 30Å to 1 mm. With respect to the thermal conductivity, a film thickness of between 100Å and 10 μm is better, and with respect to the friction resistance, a film thickness of 10 μm to 1 mm is better. It is desirable that the heat resist temperature of the supporting member be between 50° C. and 300° C.

The shape of the supporting member can also be a belt shape, a plate shape or a drum shape. The shape of the supporting member can be selected in accordance with the usage of an image forming apparatus. In particular, drum shapes have the advantage of being able to ensure good dimensional accuracy. In a case of plate shapes, the size of the plate is determined in accordance with the size of the recording sheet to be used.

Moreover, when a mixture made of the above compound (material formed on the surface of the recording medium (A)) and other material, such as hydrophobic polymer or hydrophobic inorganic material is formed on the supporting member, there is the advantage of preventing dirtying of a background of the image at printing. In addition, in order to raise the thermoconductivity, metal powder or the like can be mixed in the above described compound. Furthermore, in order to increase the adhesiveness between the supporting member and the above described compound, a primer layer can be provided between the supporting member and the compound. The thermal resistance supporting member can be formed of a resin film, such as a polyimide film, a polyester film or the like, a glass, a metal such as Ni, Al, Cu, Cr, Pt or the like, or a metallic oxide. The surface of the supporting member can be smooth, rough or porous.

A description will now be given of heating means.

The heating means can be a heater, a thermal head or another type of contact heating device, or it can also be a non-contact type of heating device which uses electromagnetic radiation (such as a laser light, infra-red radiation lamps or some type of light which is irradiated from a light source and focused through a lens system).

The time it takes to heat the recording medium (A) depends on the kind of material forming the recording medium (A). It is preferable that the time it takes to heat the recording medium (A) be in a range of 1 μsec.-100 msec. A temperature at which the recording medium (A) is heated is in a range between a temperature slightly less than a glass transition point or a melting point of the material forming the recording medium (A) and a separation point of the material forming the recording medium (A). That is, the recording medium (A) can be heated at a temperature in a range of 50° C.-300° C. It is preferable that the recording medium (A) be heated at a temperature in a range of 80° C.-150° C. In the contact heating method, it is preferable that a thermal head be used as a heat source. The heat source can heat, directly or via the solid member, the recording medium (A). In a case where the recording medium (A) is heated via the solid member, the solid member is preferably made thin as possible. A temperature at which the recording medium (A) is cooled after heating is less than a minimum temperature at which an adhesion area where the receding contact angle is decreased can be formed. The recording medium (A) can be rapidly or gradually cooled.

FIGS.2A and 2B show the principle of the present invention.

Referring to FIGS. 2A and 2B, a recording medium 1 has a base member 11 and a recording layer 12 formed on the base member 11. The recording layer has the above novel characteristic.

In a process shown in FIG. 2A, a solid member 3 is brought into contact with the recording layer 12 of the recording medium 1, and then a heater 4 selectively heats the recording layer 12 via the solid member 3. After this, the recording layer 12 of the recording member 1 is cooled. The solid member 3 is removed from the recording medium 1 after the recording medium 1 is cooled. Advancing contact angles and receding contact angles on the recording layer 12 with respect to a solid before and after heating thereof are shown in FIG. 3. Referring to FIG. 3, the receding angle $\theta_r$ decreases after heating. In general, it is difficult for a liquid to adhere to an area on which the receding contact angle $\theta_r$ is greater than 90° (liquid repellency). On the other hand, the liquid can easily adhere to an area on which the the receding contact angle $\theta_r$ is equal to or less than 90° (liquid adhesion). Thus, according to the above process shown in FIG. 2A, an adhesive area S to which the liquid can easily adhere is formed on the recording layer 12 of the recording medium 1. A latent image is then formed on the adhesive area. Further, when the recording layer 12 is heated under a condition where no solid is in contact with the recording layer 12, the receding contact angle $\theta_r$ is increased and returns to an original value.

In a process shown in FIG. 2B, the recording layer 12 of the recording medium 1 is heated by the heater 4. Then the solid member 3 is brought into contact with the surface of the recording layer 12 before the recording layer 12 is cooled. After this, the recording layer 12 is cooled, and then the solid member 3 is separated from the recording layer 12. According to the above process shown in FIG. 2B, the adhesive area S is formed on the recording layer 12 in the same manner as the adhesive area S obtained by the process shown in FIG. 2A.

A phenomena similar to the above phenomena is disclosed in Japanese Patent Publication No.54-41902, described above. However, this disclosed process differs from the process of the present invention in that the recording material is effectively disordered and in that the mechanism obtains a layer of an amorphas memory substance. That is, in the present invention, it is not possible to change the state of the surface of the recording medium (A) without the contact material (B). In addition, in the process disclosed in Japanese Patent Publication No.54-41902, it is not possible to obtain the reversible change by a simple operation.

When the recording medium is heated at a temperature in a range of 50°-300° C. without the solid member, the latent image can be removed from the recording medium (A). It is preferable that the temperature be in a range of 100°-180° C. to erase the latent image. The time it takes to heat the recording medium (A) is in a range of 1 msec.-10 sec., and preferably in a range of 10 msec.-1 sec.

Figure 4B:
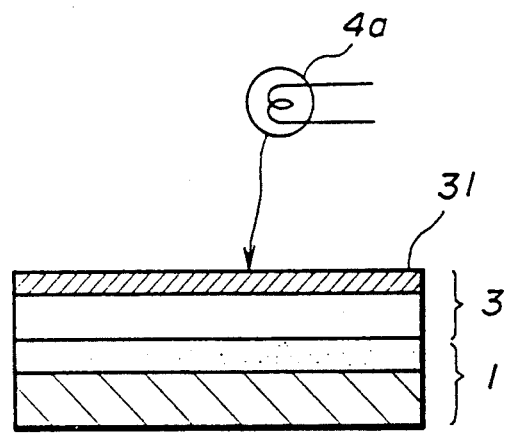

The forming and erasing of the image can be carried out by a contact heating method in which a member is heated by a thermal source in contact with the member or a non-contact heating method in which a member is heated by a thermal source not in contact with the member. In the non-contact heating method, an infra-red lamp, a semiconductor laser unit or the like can be used as a thermal source. The recording medium (A) can be directly heated by the thermal source or heated via the solid member 3 heated by the thermal source, in the non-contact heating method. FIGS. 4A and 4B show examples in which the recording medium is heated in accordance with the non-contact heating method. Referring to FIG. 4A, a light absorbing layer 13 is set between the base member 11 and the recording layer 12, so that the recording medium is formed of the base member 11, the light absorbing layer 13 and the recording layer 12. The solid member 3, which is brought into contact with the recording layer 12 when the recording layer 12 is heated, is formed of a material through which a light including an infra-red ray can pass (a transparent material). In this case, a light emitted from a light source 4a passes through the solid member 3 and reaches the recording layer 12. The recording layer 12 is heated by the light and the light absorbing layer 13 is also heated by the light via the recording layer 12. Due to a heat generated in the light absorbing layer 13, the recording layer 12 can be easily heated by the light. Referring to FIG. 4B, a light absorbing layer 31 is provided on the solid member 3. A light emitted from the light source 4a is absorbed into the light absorbing layer 31, so that the light absorbing layer 31 generates heat. The heat generated by the light absorbing layer 3 effectively heats the recording medium 1 via the solid member 3.

A detailed description will now be given of means for recording image information on the surface of the recording medium (A).

Figure 5A:
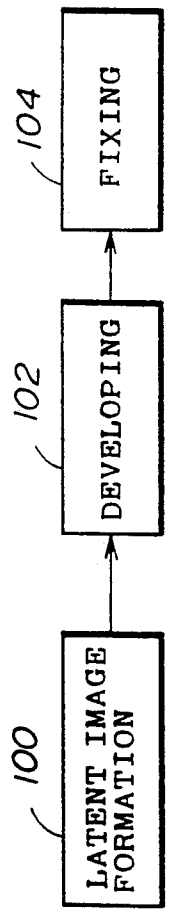
FIGS.5A, 5B and 5C are block diagrams illustrating recording processes according to the present invention.

As shown in FIG. 5A, the surface of the recording medium (A) is heated in accordance with a image information signal in a condition where a solid is provided on the surface of the recording medium (A), and thus liquid adhesion areas are formed on the surface of the recording medium (A) (latent image formation step 100). After this, ink (a recording agent) is brought into contact with the surface of the recording medium (A) so that the ink adheres to the latent image portion (developing step 102). Then, the image formed by the ink is fixed on the surface of the recording medium (A) (fixing step 104). The above process for recording the image is often referred to as a direct recording process.

Figure 5B:
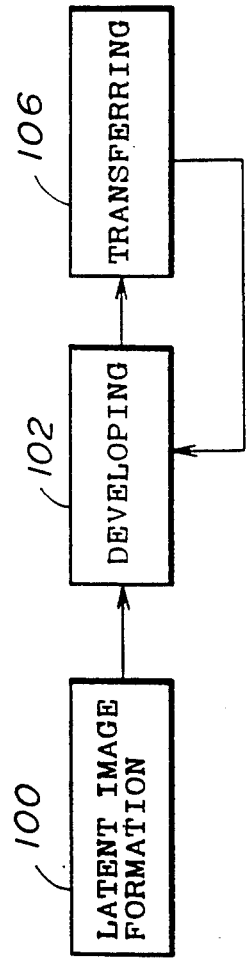

As shown in FIG. 5B, the surface of the recording medium (A) is heated in accordance with the image information signal in the condition where the solid is contact with the surface of the recording medium (A), and thus liquid adhesion areas are formed on the surface of the recording medium (A) (latent image formation step 100). After this, the ink is brought into contact with the surface of the recording medium (A) so that the ink adheres to the latent image portion (developing step 102). Then, the image formed by the ink is transferred to a recording sheet (transferring step 106). This process for recording image on the recording sheet is often referred to as an indirect recording process. Furthermore, if the step where the ink is brought into contact with the latent image portion on the surface of the recording medium (A) and the step where the image formed by the ink is transferred to the recording sheet are sequentially repeatedly carried out, the images are successively formed on the recording sheets. That is, a printing process in which the recording medium (A) is used as a printing plate is obtained.

Figure 5C:
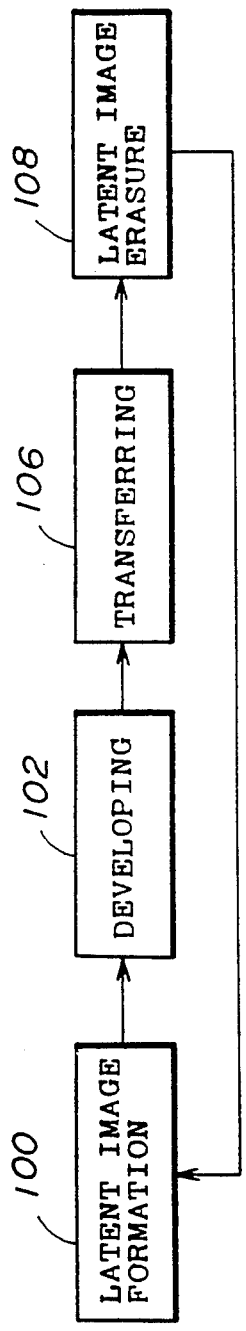

As shown in FIG. 5C, after the latent image formation step 100, the developing step 102 and the transferring step 106 are sequentially carried out, the surface of the recording medium (A) is heated without the solid so that the latent image is erased from the surface of the recording medium (A). That is, an image forming process in which it is possible to repeatedly form different latent image on the surface of the recording medium (A). This process for repeatedly forming the image on the recording medium (A) is referred to as a repeat recording process.

The recording medium (A) can have any shape. That is, the recording medium (A) can be shaped like a cylindrical rigid body or a flexible film. In a case where the recording medium (A) is shaped like a cylindrical rigid body (the film having the novel characteristic is deposited on a cylindrical rigid base), as the recording medium (A) can be accurately rotated, stable images can be formed on the recording medium (A). Thus, it is preferable that the recording medium (A) has a shape like a cylindrical rigid body. The recording medium (A) can be made by a process in which the film having the above novel characteristic is formed on a base member. The recording medium (A) can be also made of only a material having the above novel characteristic. As the recording medium (A) made of only the material having the above novel characteristic is mechanically weak, it is preferable that the recording medium (A) be made by the process in which the film having the novel characteristic is formed on the base member.

In a case where the base member of the recording medium (A) is made of resin, the recording medium (A) has poor thermal conductivity. Thus, it takes much time for a temperature of the surface of the recording medium (A) to reach a temperature at which the liquid can be adhered to the surface of the recording medium (A). Thus, it is preferable that a material having high thermal conductivity form a part or whole of the base member 1.

In a case where the recording medium (A) has a base member made of a material having high thermal conductivity, such as metal, a thin organic film is formed on the base member by evaporation, and the film having the novel characteristic which is formed on the thin organic film, the thermal conductivity in a vertical direction can be improved. The thin organic film can be made, for example, of polyimide, polyester, phthalocyanine, or the like. In a case where the size of printed dot may be large, the recording medium (A) having the above layered structure has no problem. On the other hand, as an area to which the liquid can be adhered is spread by a thermal diffusion in a horizontal direction in the recording medium (A), it is difficult to print image dots at a higher printing rate by use of the recording medium having the above layered structure. Therefore, it is preferable that the material having high thermal conductivity be separately divided into a plurality of parts on the base member. In this case, the thermal diffusion in the horizontal direction can be prevented from increasing, so that an area to which the liquid can be adhered can be minimized. That is, the image dots can be printed at a higher printing rate.

FIG.6 shows a first embodiment of an image forming apparatus having the novel recording medium (A).

Referring to FIG.6, a recording medium 1 having a drum-shape is rotated in a counterclockwise direction at a predetermined speed. A vat 30 which stores ink 5 is provided adjacent to the recording medium 1 so that the surface of the recording medium 1 is soaked in the ink 5. A thermal head 4b and a contact belt 3 are provided at an upper stream side of the vat 30. The contact belt 3 is wound around rollers 31 and 32 and the thermal head 4b so that the contact belt 3 is set between the thermal head 4b and the surface of the recording medium 1. That is, the thermal head 4b presses the contact belt 3 against the surface of the recording medium 1. The thermal head 4b is driven in accordance with image information supplied from a controller (not shown). The contact belt 3 is rotated in a clockwise direction at a predetermined speed by the rotation of the rollers 31 and 32. A transfer roller 6 is provided at a lower stream side of the vat 30. A recording paper P is set between the transfer roller 6 and the surface of the recording medium 1 so that the transfer roller 6 presses the recording paper P against the surface of the recording medium 1. When the transfer roller 6 is rotated in the clockwise direction, the recording paper P is fed from a lower side of the transfer roller 6 to an upper side thereof. Further, an infra-red lamp 7 is provided at a upper stream side of the thermal head 4b. The infra-red lamp 7 is used to erase latent images formed on the surface of the recording medium 1.

Figure 7:
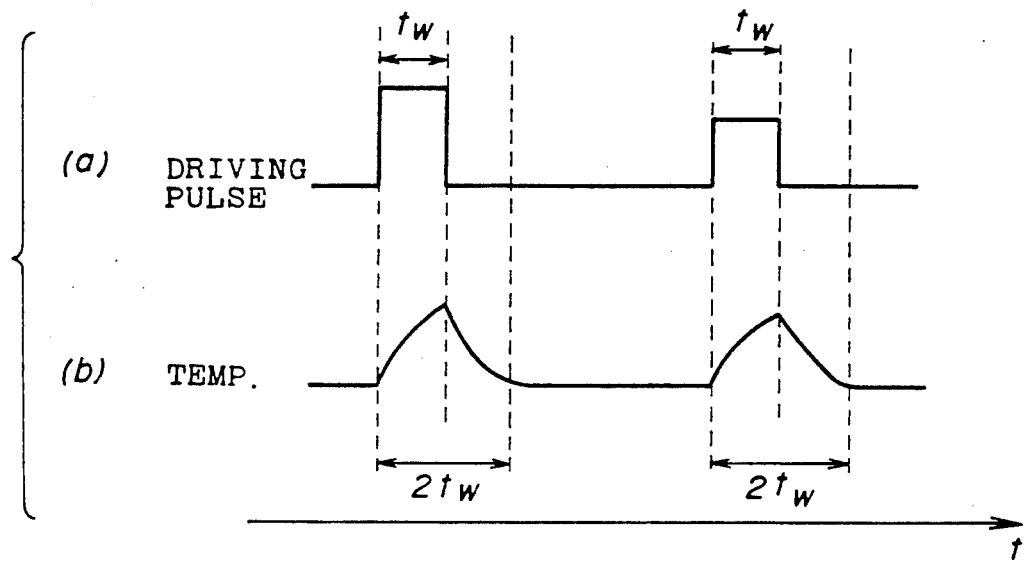
FIG.7 is a timing chart illustrating a driving pulse supplied to each thermal element of a thermal head and a temperature of a surface of each thermal element.

In the above image forming apparatus, driving pulses corresponding to the image information are supplied to each thermal element of the thermal head 4b, for example, as shown in FIG.7 (a). In this case, the temperature of the surface of each thermal element to which a driving pulse is supplied varies as shown in FIG.7 (b). That is, the temperature of the surface of each thermal element substantially reaches a maximum value at a timing that the driving pulse is turned off, and then it gradually decreases. The temperature of the surface of each thermal element returns to a temperature approximately equal to room temperature after a period of time about twice as long as the driving pulse width $t_w$. The driving pulse width $t_w$ is set, for example, at about 1 msec.

The rotation speeds of both the recording medium 1 and the contact belt 3 and a width at which the contact belt 3 is in contact with the surface of the recording medium 1 are respectively adjusted so that the contact belt 3 is in contact with the surface of the recording medium 1 for a period of time equal to or greater than twice as long as the driving pulse width $t_w$. That is, when a period of time equal to or greater than twice as long as the driving pulse width $t_w$ elapses after the driving pulse is turned on, the contact belt 3 is separated from the surface of the recording medium 1.

When the driving pulse turns on, the surface of the recording medium is heated by each thermal element of the thermal head 4b under a condition in which the contact belt 3 is in contact with the surface of the recording medium 1. Then, when the driving pulse turns off, the surface of the recording medium is naturally cooled under the condition in which the contact belt 3 is in contact with the surface of the recording medium 1. Thus, the receding contact angle of an area heated on the recording medium 1 decreases, so that an adhesion area S to which the liquid can easily adhered is formed. That is, a latent image is formed by the adhesion area on the surface of the recording medium 1. When the surface of the recording medium 1 is soaked in the ink 5, the ink 5 is adhered to the adhesion area, so that a dot visible image 5a corresponding to the latent image is formed on the surface of the recording medium 1. Then, the dot visible image 5a is transferred to the recording paper P by the transfer roller 6, so that a visible image is formed on the recording paper P. After the dot visible image 5a is transferred to the recording paper P, the surface of the the recording medium 1 is heated by the infra-red lamp 7 under a condition in which no solid material is in contact with the surface of the recording medium 1. Thus, the receding contact angle of the adhesion area S returns to an original value, so that the adhesion area is removed from the recording medium 1. That is, the latent image is erased.

In a case where the infra-red lamp 7 is not activated, as the latent image is not erased, the same images can be sequentially formed on the recording paper P in accordance with the process described above.

A description will now be given of a modification of the embodiment shown in FIG.6, with reference to FIG.8.

Figure 8:
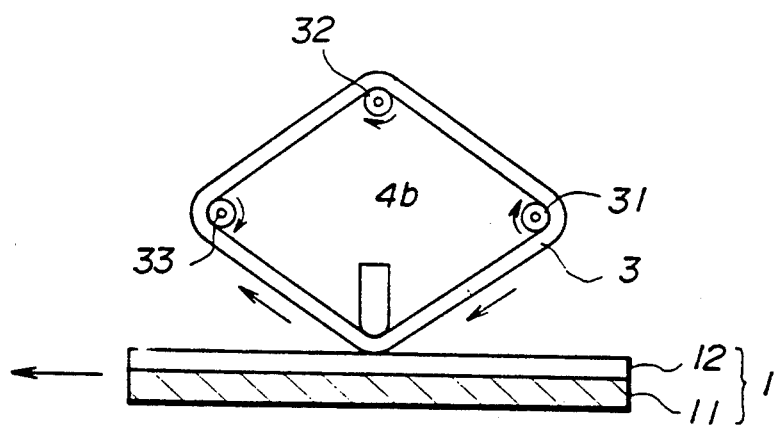
FIG.8 is a diagram illustrating a modification of the first embodiment shown in FIG.6.

FIG.8 shows only a mechanism for forming a latent image. A visible image can be formed in the same manner as that shown in FIG.6.

Referring to FIG.8, a recording medium 1 has a sheet-shape. That is, a recording layer 12 having the novel characteristic is formed on a sheet-shaped base 11. The contact belt 3 is wound around rollers 31, 32 and 33 and the thermal head 4b so that the contact belt 3 is set between the thermal head 4b and the surface of the recording layer 12. The recording medium 1 is moved in a predetermined direction parallel to the surface of the recording medium 1. The contact belt 3 is rotated in a predetermined direction so as to cooperate with the recording medium 1. The thermal head 4b presses the contact belt 3 against the surface of the recording layer 12.

In the mechanism shown in FIG.8, an latent image is formed on the recording medium 1 in accordance with the same process as that described above based on FIG.6, and then a visible image corresponding the latent image is also formed by the same process as that described above.

In a case where the recording layer 12 and the sheet-shaped base 11 are transparent, the recording medium 1 on which the visible image is formed can be used as an original slide plate of a slide projector. Further, in this case, the recording medium 1 can be also used as a medium in which information is stored. The information is optically detected by irradiating the recording medium 1.

A unit for heating the surface of the recording medium to erase the latent image is arranged so that the surface of the recording medium heated by the unit is completely cooled before the next latent image starts to be formed by the thermal head.

Transparent and opaque films formed of resin, standard papers, papers used in an ink jet printer and type papers can be used as the recording papers.

Figure 9:
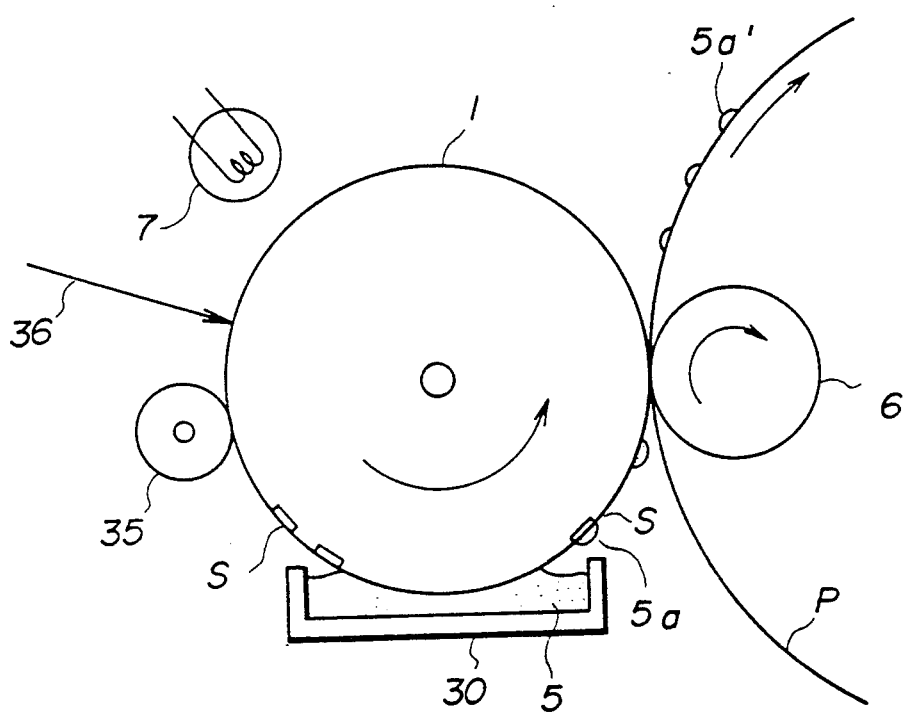
FIG.9 is a diagram illustrating an image forming apparatus according to a second embodiment of the present invention.

FIG.9 shows a second embodiment of an image forming apparatus having the novel recording medium (A). In FIG.9, those parts which are the same as those shown in FIG.6 are given the same reference numbers.

Figure 10:
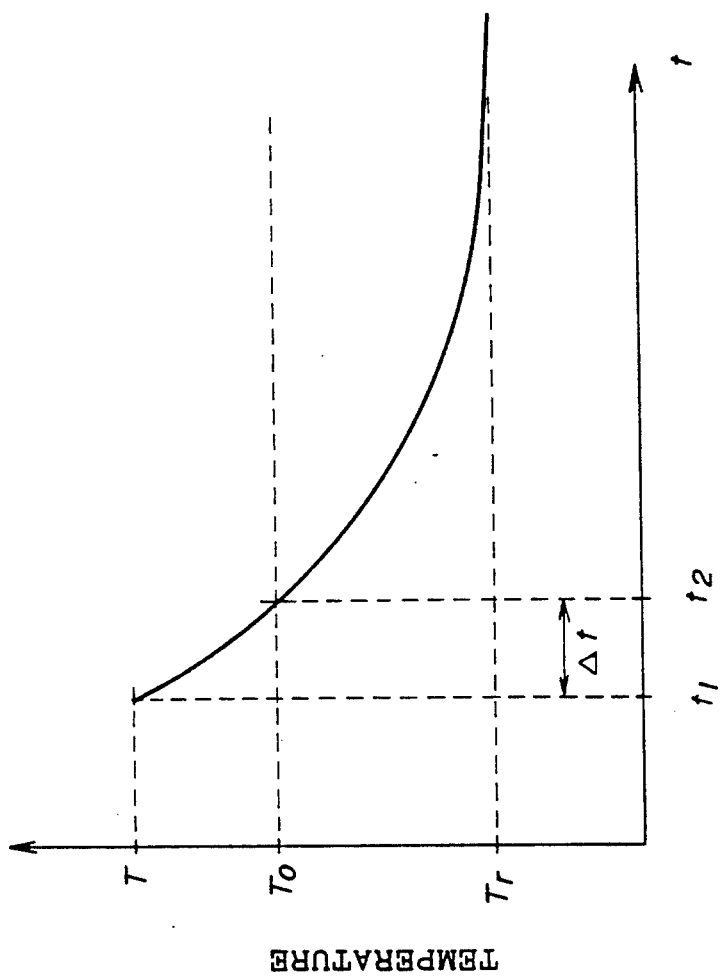
FIG.10 is a graph illustrating a temperature on the surface of the recording medium shown in FIG.9.

Referring to FIG.9, the vat 30 in which the ink 5 is stored, the transfer roller 6 pressing the recording paper P against the recording medium 1 and the infra-red lamp 7 are respectively arranged in the same manner as those shown in FIG.6. A contact roller 35 formed of metal is arranged at the upper stream side of the vat 30. The contact roller 35 is in contact with the surface of the recording medium 1 and rotated with the recording medium 1. A laser beam 36 emitted from a laser unit (not shown) projects onto the surface of the recording medium 1. A spot of the laser beam 36 is positioned at immediately upper side of the contact roller 35. The laser beam 36 is modulated in accordance with image information and heats the recording medium 1. An area heated by the laser beam 36 is maintained at a temperature greater than a minimum temperature at which the receding contact angle $\theta_r$ can be decreased until the area is brought into contact with the contact roller 35. When the area which has been heated by the laser beam 36 is brought into contact with the contact roller 35, the area is compulsorily cooled by the contact roller 35. That is, as shown in FIG.10, when the area is brought into contact with the contact roller 35 at $t_1$, the temperature of the area gradually decreases from T and then reaches the minimum temperature $T_o$, at which the receding contact angle $\theta_r$ can be decreased, at $t_2$. Then the temperature of the area further decreases toward the room temperature $T_r$. The recording medium 1 and the contact roller 35 are respectively controlled at predetermined rotation speeds so that the contact roller 35 is maintained in contact with the surface of the recording medium for a time equal to or greater than $\Delta t$ which is a different time between $t_1$ and $t_2$ shown in FIG.10. That is, the surface of the contact roller 35 is separated from the surface of the recording medium 1 at a time after $t_2$, in FIG.10. The different time $\Delta t$ is, for example, set equal to or greater than 0.1 msec.

In a case where the rotation speeds of the contact roller 35 and the recording medium 1 are controlled as has been described above, the area on the surface is brought into contact with the contact roller 35 (a solid material) under a condition where the area is maintained at a temperature greater than the minimum temperature at which the receding contact angle $\theta_r$ can be decreased. The area becomes an adhesion area to which the liquid can be adhered. That is, a latent image corresponding to the adhesion area is formed on the surface of the recording medium 1. The latent image is developed by the ink 5 in the vat 30, and then the visible image is formed on the recording paper P, in accordance with the same procedure as that described in FIG.6.

A description will now be given of the recording agent.

To form a visible image on the recording medium (A), the recording agent is selected from; writing ink, ink for ink jet printing, printing ink, electrostatic transfer toner and some other recording agent used in conventional printing processes.

In examples of water-soluble inks, water soluble ink containing water and humictants as the main components, water based pigment dispersal inks that have water, pigments, macromolecule compounds for dispersal and humictants as the main components, or emulsion inks in which pigments or yes are surface activated agents that are dispersed in water. The humictants used in water based inks can be any of the following water-soluble organic compounds:

Ethanol, methanol, propanol and other monovalent alcohols; ethylene glycol, diethylene glycol, triethylene glycol, tetraethylene glycol, polyethylen glycol, propylene glycol, dipropylene glycol, glycerine and other multivalent alcohols; ethylene glycol monomethyl ether, diethylene glycol monoethyl ether, triethylene glycol monomethyl ether, tetraethylene glycol monomethyl ether, propylene glycol monomethyl ether, ethylene glycol, diethylene glycol monoethyl ether, triethylene glycol monoethyl ether, tetraethylene glycol monoethyl ether, propylene glycol monoethyl ether and other monovalent alcohol ether; N-methyl-2pyyrolidone, 1,3-dimethyl-imidazolricinon, $\epsilon$-caprolactum and other heterocyclic compounds; monoethanol amine, diethanol amine, triethanol amine, monoethyl amine, diethyl amine, triethyl amine and other amines.

The water-soluble dye can be a dye which is classified by the color index into acid dyes, direct dyes, basic dyes, and reactive dyes. The examples of dyes are indicated as follows.

C.I. acid yellow: 17, 23, 42, 44, 79, 142

C.I. acid red: 1, 8, 13, 14, 18, 26, 27, 35, 37, 42, 52, 82, 87, 89, 92, 97, 106, 111, 114, 115, 134, 186, 249, 254, 289

C.I. acid blue: 9, 29, 45, 92, 249, 890

C.I. acid black: 1, 2, 7, 24, 26, 94

C.I. food yellow: 3, 4

C.I. food red: 7, 9, 14

C.I. food black: 2

C.I. direct yellow: 1, 12, 24, 26, 33, 44, 50, 142, 144, 865

C.I. direct red: 1, 4, 9, 13, 17, 20, 28, 31, 39, 80, 81, 83, 89, 225, 227

C.I. direct orange: 26, 29, 62, 102

C.I. direct blue: 1, 2, 6, 15, 22, 25, 71, 76, 79, 86, 87, 90, 98, 163, 165, 202

C.I. direct black: 19, 22, 32, 38, 51, 56, 71, 74, 75, 77, 154, 168

C.I. basic yellow: 1, 2, 11, 14, 15, 19, 21, 23, 24, 25, 28, 29, 32, 36, 40, 41, 45, 49, 51, 53, 63, 65, 67, 70, 73, 77, 87, 91

C.I. basic red: 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112

C.I. basic blue: 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155

C.I. basic black: 2, 8

The pigment can be organic pigment such as azo pigment, phthalocyanine pigment, anthraquinone pigment, quinacridon pigment, diexazine pigment, indigo pigment, dioindigo pigment, perynone pigment, perylene pigment, iso-indolenone pigment, aniline black, azomethine azo pigment, carbon block and others. The inorganic pigment can be iron oxide, titanium oxide, calcium carbonate, baruim sulfate, ammonium hydroxide, barium yellow, prussian blue, cadmium red, chrome yellow and metal powder.

The dispersed pigment compounds can be polyacrylamide, polyacrylate and other alkali metallic salt, soluble styrene arcylic resin and their acryl family resin, soluble vinyl napthalene acid resin, polyvinyl pyrrolidone, polyvinyl alcohol, and its alkali salt, macromolecule compound which includes salt with cation functional group such as ammonium and amino group etc., polyethylene oxide, gelatine, casein and other proteins, arabia rubber, traganth rubber and other natural rubber, saponin and other qlucoxyde, carboxy-methyl cellulose, hydroxyethyl cellulose, methyl cellulose and other cellulose inductors, lignin sulfonic acid and its salt, ceramics and other natural macromolecule compounds, and the like.

Representative examples of the oil-based type dyes are indicated as follows:

C.I. solvent yellow: 1, 2, 3, 4, 5, 6, 7, 8, 9, 10, 11, 12, 14, 16, 17, 26, 27, 29, 30, 39, 40, 46, 49, 50, 51, 56, 61, 80, 86, 87, 89, 96

C.I. solvent orange: 12, 23, 31, 43, 51, 61

C.I. solvent red: 1, 2, 3, 16, 17, 18, 19, 20, 22, 24, 25, 26, 40, 52, 59, 60, 63, 67, 68, 121

C.I. solvent violet: 7, 16, 17,

C.I. solvent blue: 2, 6, 11, 15, 20, 30, 31, 32, 35, 36, 55, 58, 71, 72

C.I. solvent brown: 2, 10, 15, 21, 22

C.I. solvent black: 3, 10, 11, 12, 13.

In addition, oil bases in which a pigment is dissolved or in which a pigment is dispersed include n-octane, n-decane, Milanese spirit, ligroin, naptha, benzene, toluene, xylene and other hydrocarbons; dibutyl ether, dihexylether, anisole, phenetole, dibenzyl ethers and other ethers; methanol, ethanol, isopropyl alcohol, benzyl alcohol, ethylene glycol, diethylene glycol, glycerine and other alcohols.

It is also possible to use the previously described pigments for the oil-based inks as well. Example of oil-based pigment dispersal agents include polymethacrylate esters, polyacrylate esters, methacrylate ester-acrylate ester copolymers, ester cellulose, methyl cellulose and other cellulose resins, polyester, polyamide, phenol resins and other polymer resins, rosine, ceramics, gelatine, casein and other natural resins and the like.

EXAMPLES

Example 1

A material of the recording layer (the film having the novel characteristic) was obtained by the solution polymerization in which acrylate monomer including fluorine (manufactured by OSAKA OGANIC CHEMICAL CO., LTD ; Viscoat 17F) was polymerized in 1-1-1 trichloroethan. A polyimide film (manufactured by TORAY-DOPONT CO., LTD ; Capton 200H) having about 25 $\mu$m thickness was used as the base member of the recording medium. The above material of the recording layer was diluted with the freon-113, and the base member was dipped in the diluted material of the recording layer and coated therewith. After this, the structure in which the base member was coated with the material of the recording layer was dried for 30 minutes at 130° C., so that the recording medium in which the recording layer having about the thickness of 1 $\mu$m was formed on the base member was obtained.

An aluminum foil on the market was used as the contact solid material, and the latent image was formed on the recording medium (A) in accordance with the following procedure.

The aluminum foil was brought into contact with the surface of the recording medium (A). A heater maintained at 130° C. pressed the aluminum foil against an area of the recording medium for 1 second, so that the area of the recording medium was heated under a condition in which the aluminum foil was in contact therewith for 1 second. Then, while the condition in which the aluminum foil was in contact with the recording medium (A) was maintained, the area was cooled until the temperature thereof reached 30° C. After this, the aluminum foil was removed from the surface of the recording medium (A).

As the result of the above process, contact angles with respect to the water on the heated area and nonheated area on the surface of the recording medium were obtained as indicated in the following Table-1.

TABLE 1

|  | NON-HEATED AREA | HEATED AREA |
|---|---|---|
| ADVANCING CONTACT ANGLE | 120° | 125° |
| RECEDING CONTACT ANGLE | 100° | 75° |

In Table-1, the receding contact angle on the heated area was 25° less than that on the non-heated area. The liquid (ink) was adhered to the heated area.

Example 2

A material of the recording layer (the film 2) was obtained by the solution polymerization in which methacrylate monomer including fluorine (manufactured by OSAKA OGANIC CHEMICAL CO., LTD; Viscoat 17FM) was polymerized in 1-1-1 trichloroethan. A polyimide film (manufactured by TORAY-DOPONT CO., LTD; Capton 200H) having about 25 μm thickness was used as the base member of the recording medium (A). The above material of the recording layer was diluted with freon-113, and the base member was dipped in the diluted material of the recording member and coated therewith. After this, the structure in which the base member was coated with the material of the recording layer was dried for 30 minutes at 130° C., so that the recording medium in which the recording layer having about the thickness of 1 μm was formed on the base member was obtained.

A glass plate on the market was used as the contact solid material, and the latent image was formed on the recording medium (A) in accordance with the following procedure.

The glass plate was brought into contact with the surface of the recording medium (A). A heater maintained at 130° C. pressed the glass plate against an area of the recording medium for 1 second, so that the area of the recording medium was heated under a condition in which the glass plate was in contact therewith for 1 second. Then, while the condition in which the glass plate was in contact with the recording medium (A) was maintained, the area was cooled until the temperature thereof reached 30° C. After this, the glass plate was removed from the surface of the recording medium (A).

As the result of the above process, contact angles with respect to the water on the heated area and non-heated area on the surface of the recording medium were obtained as indicated in the following Table-2.

TABLE 2

|  | NON-HEATED AREA | HEATED AREA |
| --- | --- | --- |
| ADVANCING CONTACT ANGLE | 120° | 125° |
| RECEDING CONTACT ANGLE | 110° | 85° |

In Table-2, the receding contact angle on the heated area was 25° less than that on the non-heated area. The liquid (ink) was adhered to the heated area.

Example 3

The same recording medium as that in Example 1 was used. A polyimide film on which aluminum was deposited by evaporation was used as the contact solid material. The polyimide film had about 12.5 μm thickness. The surface of the aluminum on the polyimide film was brought into contact with the surface of the recording medium (A). A thermal head, in which thermal elements was arranged in a line at a rate of 8 dot/mm, pressed the polyimide film against the surface of the recording medium (A), as shown in FIG.8. While the thermal head was selectively driven in accordance with an image signal, the recording medium was moved at a predetermined speed. The surface of the recording medium (A) was brought into contact with the water-soluble ink. As the result, the water-soluble ink was adhered to only an area which had been heated. The water-soluble ink adhered to the area on the recording medium was transferred to a recording paper by a transfer process, so that an image corresponding to the image signal was formed on the recording paper.

The present invention is not limited to the aforementioned embodiments, and variations and modifications may be made without adparting from the scope of the claimed invention.

What is claimed is:

1. A process for forming an image on a recording medium, a surface of said recording medium having a characteristic in which a receding contact angle decreases when said recording medium is heated under a condition in which a solid material is in contact with the surface of said recording medium, said process comprising the following steps (a) through (d) of:
    (a) bringing a solid member into contact with the surface of said recording medium;
    (b) selectively heating the surface of said recording medium, so that the surface of the recording medium is heated under a condition in which said solid member is in contact with the surface of the recording medium;
    (c) cooling the recording medium under the condition in which said solid member is in contact with the surface of the recording medium; and
    (d) separating said solid member from the surface of the recording medium,
    whereby a receding contact angle on an adhesive area which is an area heated by said step (b) on the surface of said recording medium is decreased and reaches a value corresponding to a temperature at which said adhesive area is heated, and whereby a latent image corresponding to said adhesive area is formed on the surface of said recording medium.

2. A process as claimed in claim 1, wherein said step (a) has a step of bringing a conductor member which is solid into contact with the surface of said recording medium.

3. A process as claimed in claim 2, wherein a member formed of metal is used as said conductor member.

4. A process as claimed in claim 1, wherein said step (a) has a step of bringing an insulator member which is solid into contact the surface of said recording medium.

5. A process as claimed in claim 4, wherein a member formed of resin is used as said insulator member.

6. A process as claimed in claim 4, wherein a member formed of glass is used as said insulator member.

7. A process as claimed in claim 1, wherein, said step (b) has a step of heating the surface of said recording medium via said solid member which is in contact with the surface of said recording medium.

8. A process as claimed in claim 7, wherein a heater unit in contact with said solid member heats the surface of said recording medium via said solid member.

9. A process as claimed in claim 7, wherein a heater unit which is not in contact with said solid member heats the surface of said recording medium via said solid member.

10. A process as claimed in claim 9, wherein a light source is used as the heater unit, wherein a light beam emitted from said light source is projected onto said solid member so that the surface of said recording medium is heated by the light beam via said solid member.

11. A process as claimed in claim 10, wherein a member transparent with respect to the light beam from said light source is used as said solid member.

12. A process as claimed in claim 1, wherein said step (a) is carried out after said step (b) so that the surface of said recording medium is heated under the condition in which said solid member is in contact with the surface of said recording medium.

13. A process as claimed in claim 1, wherein said step (b) has a step of maintaining said solid member on the surface of said recording medium so that the surface of said recording medium is naturally cooled.

14. A process as claimed in claim 1 further comprising the step (e) of:
(e) supplying a recording agent to the surface of said recording medium, so that the recording agent is adhered to said adhesive area on the surface of said recording medium, and a visible image corresponding to the latent image is formed on the surface of said recording medium.

15. A process as claimed in claim 14 further comprising the step (f) of:
(f) transferring the visible image obtained by said step (e) to a recording sheet, so that a visible image is formed on the recording sheet.

16. A process as claimed in claim 1, wherein a member is used as said recording medium, said member having a layer formed of a compound including a macromolecule polymer in which a main chain and side chains are linked by linking groups, each of the side chains having a hydrophobic group.

17. A process as claimed in claim 1, wherein a member is used as said recording medium, said member having a layer formed of a base material and a compound having a hydrophobic group, said compound being formed on a surface of said base material by physical or chemical linking.

18. A process as claimed in claim 17, wherein an organic material is used as the base material.

19. A process as claimed in claim 17, wherein an inorganic material is used as the base material.

20. A process as claimed in claim 1, wherein a member is used as said recording medium, said member having a layer formed of an organic compound consisting of a hydrophobic group.

21. A process as claimed in claim 1, wherein a member is used as said recording medium, said member having a layer formed of a compound including a macromolecule polymer in which a main chain and side chains are linked by linking groups, each of the side chains having a chain molecule connected to each of the linking group and a hydrophobic group connected to the chain molecule.

* * * * *